United States Patent [19]
Fleischman

[11] Patent Number: 5,918,637
[45] Date of Patent: Jul. 6, 1999

[54] PLATES PERFORATED WITH VENTURI-LIKE ORIFICES

[76] Inventor: William H. Fleischman, 836 Rio Dr., Friendsville, Tenn. 37737

[21] Appl. No.: 08/106,546

[22] Filed: Aug. 16, 1993

[51] Int. Cl.$^6$ ........................................... F15D 1/02
[52] U.S. Cl. .................................. 138/44; 138/40
[58] Field of Search ........................... 138/40, 44

[56] References Cited

U.S. PATENT DOCUMENTS

| | | | |
|---|---|---|---|
| 2,044,806 | 6/1936 | Naiman | 138/44 |
| 2,127,501 | 8/1938 | Dall | 138/44 |
| 2,842,962 | 7/1958 | Dall | 138/44 |
| 3,111,091 | 11/1963 | Hopkinson | 138/44 |
| 3,229,723 | 1/1966 | Janton | 138/44 |
| 3,517,700 | 6/1970 | Williams et al. | 138/44 |
| 3,628,140 | 12/1971 | Hogg et al. | 138/44 |
| 3,702,144 | 11/1972 | Loveland | 138/44 |
| 3,894,562 | 7/1975 | Moseley et al. | 138/44 |
| 4,105,721 | 8/1978 | Schliebe | 138/44 |
| 4,174,734 | 11/1979 | Bradham | 138/44 |
| 4,324,112 | 4/1982 | Fujiwara et al. | 138/44 |
| 4,338,969 | 7/1982 | Usry | 138/44 |
| 4,688,755 | 8/1987 | Pluviose | 138/44 |

*Primary Examiner*—David Scherbel
*Assistant Examiner*—James F. Hook
*Attorney, Agent, or Firm*—Robert E. Bushnell, Esq.

[57] ABSTRACT

Plates that are perforated with two or more venturi orifices that have "$C_d$" discharge coefficient values that are greater than 1.0. The venturi orifices to be used can be made in an infinite number of tubes that have a converging entrance, a throat, and a diverging discharge. The plates are to be used to make improved devices to be used in fluid flow streams.

30 Claims, 5 Drawing Sheets

PLATES PERFORATED WITH VENTURI-LIKE ORIFICES

BACKGROUND

1. Field of Invention

This invention relates to devices used in fluid flow streams. Devices such as fluid distributor plates, filters, heat exchangers, valves, and flow metering plates.

2. Description of Prior Art

A variety of devices are used in fluid flow streams for filtering, controlling, exchanging heat, metering, and such. All such devices necessarily impede the flow to some extent. In forced flow streams such devices decrease pressure energy. Minimizing all such energy losses is desirable.

The invention herein described relates to the manufacture of plates that are perforated with two or more venturi orifices. The venturi orifices are to have "$C_d$" discharge coefficient values that are greater than 1.0. "$C_d$" is the discharge coefficient that is used in the flow formula for nozzles and orifices.

The flow formula referred to above and others are to be introduced hereinafter. Formulas are required to show that "$C_d$" values greater than 1.0 have been implied by past patents that have been granted.

Textbooks on fluid flow present the following Bernoulli Equation for steady, frictionless, incompressible flow:

$$P_1/\rho_1 + v_1^2/2g + z_1 = P_2/\rho_2 + v_2^2/2g + z_2$$

where $P_1$=initial pressure, lb per ft$^2$ $\rho_1$=initial specific weight, lb per ft$^3$ $v_1$=initial velocity, ft per sec $g$=32.2 ft per sec$^2$ $z_1$=initial elevation with reference to some base elevation, ft Any subsequent condition is $P_3$, $z_3$, etc.

All terms of the Bernoulli Equation result in feet of the fluid. The first term is called pressure head. The second term is called velocity head. The last term is called potential head.

Deriving formulas is simplified by making logical, practical, and acceptable assumptions. Assuming incompressible flow means that the specific weight does not change significantly over the range of conditions to be investigated. Thus, hereinafter, $\rho_1 = \rho_2 = \rho_3 = \rho$. Likewise, assume that the centerline of all flow streams are level. Thus, $z_1 = z_2 = z_3$. So that the potential head terms will be dropped from the Bernoulli Equation used hereinafter.

Picture a still tank of some incompressible fluid with a perfect hole in its side at "h" feet below its surface. So that $P_1 = h\rho$. For the still tank $v_1 = 0$. Neglecting insignificant air pressure differences, $P_2 = 0$. Some of the fluid will emerge at a velocity of $v_2$.
So that $$P_1/\rho = v_2^2/2g = h\rho/\rho = h$$

Resulting in $$v_2 = \sqrt{2gh}$$

If the area of the theoretically perfect jet stream described above is $A_2$, ft$^2$, the rate of discharge is exactly:

$$Q = A_2 v_2, \text{ ft}^3 \text{ per sec}$$

In this real world, the theoretically perfect is not possible. If a real nozzle were made in the tank wall as presumed above, the real discharge velocity would be in the range of 90% to 99% of the theoretical velocity. This introduces the concept of "$C_d$" called the discharge coefficient. "$C_d$" accounts for non-uniformity of velocity in the inlet and discharge, the rate of flow, fluid viscosity, and surface roughness. "$C_d$" is preferably determined by actual measurement that is called calibration. So that the real rate of discharge is calculated by:

$$Q = C_d A_2 v_2, \text{ ft}^3 \text{ per sec}$$

Therefore, for nozzles discharging from a large space or plenum chamber, the value of "$C_d$" is usually measured to be in the range of 0.90 to 0.99. Note that "$C_d$" cannot be greater than 1.0 for nozzles.

If a circular sharp edged orifice is made in the tank wall presumed above, the real discharge rate is measured to be much lower than the theoretical rate. The primary reason for the much lower rate is that the fluid flow stream emerging from the sharp edged orifice contracts in cross sectional area. A coefficient of contraction is therefore measured to account for the reduction of the area of the orifice to that of the smallest area. This coefficient of contraction is usually measured to be in the range of 0.61 to 0.72. There is a further loss measured that is called the coefficient of velocity to account for friction losses that reduce the velocity in the smallest area from the theoretical velocity. The coefficient of velocity is usually measured to be in the range of 0.95 to 0.99. Thus, "$C_d$" for circular sharp edged orifices is equal to the product of the coefficient of contraction and the coefficient of velocity. Note that "$C_d$" cannot be greater than 1.0 for circular sharp edged orifices.

Nozzles, orifices, and venturi tubes are installed into mostly round pipe lines and ducts to measure flow rates. Now the entrance velocity may be of some significant value. The flow in equals the flow out, i.e., $Q_1 = Q_2$. So that:

$$Q_1 = A_1 v_1 = A_2 v_2 = Q_2$$

Back to the Bernoulli Equation, but this time $v_1 = A_2 v_2 / A_1$, and the outlet pressure $P_2$ may now have some value.
So that $$P_1/\rho + (A_2 v_2/A_1)^2/2g = P_2/\rho + v_2^2/2g$$

Resulting in $$(P_1 - P_2)/\rho = v_2^2/2g [1 - (A_2/A_1)^2]$$

Now the real rate of discharge is calculated by:

$$Q = C_d A_2 v_2 = \frac{C_d A_2}{\sqrt{1 - (A_2/A_1)^2}} \sqrt{2g \frac{(P_1 - P_2)}{\rho}}$$

Textbooks call the ratio of the throat diameter to the inlet diameter Beta. So that:

$$\beta = d_2/d_1 \text{ or } \beta^4 = (d_2/d_1)^4 = (A_2/A_1)^2$$

By substitution:

$$Q = \frac{C_d A_2}{\sqrt{1 - \beta^4}} \sqrt{2g \frac{(P_1 - P_2)}{\rho}}$$

Textbooks publish "C" flow coefficient values for orifices and nozzles where:

$$C = \frac{C_d}{\sqrt{1-\beta^4}}$$

"C" values for nozzles and orifices are reported above 1.0 when the value of Beta is large enough. "C" values are not to be confused with "$C_d$" values. Nozzles, orifices, wire mesh screens, straight perforations, and such cannot have "$C_d$" discharge coefficient values greater than 1.0.

The diverging discharge sections of venturi tubes that are designed for flow measurement with minimum pressure drop are made to restore the discharge pressure as nearly as possible to the inlet pressure. Some overall "$C_d$" values can be calculated for such metering tubes that are marketed. See FIG. 4 of U.S. Pat. No. 4,174,734, to Bradham, (1979). Note that the ALLEN FLOW TUBE is shown as losing about 2.9% of the differential pressure at a Beta=0.75. Since no other data is given, it will be assumed here that the said flow tube had a "$C_d$"=0.98 for the inlet to throat portion. The overall "$C_d$" will be based upon the state measurement where $(P_1-P_3)$=0.029 $(P_1-P_2)$, where $P_3$ is the outlet pressure. The overall "$C_d$" value will be based upon the throat area $A_2$ since that is the standard for nozzles and orifices. Therefore:

$$\frac{(0.98)A_2}{\sqrt{1-\beta^4}}\sqrt{2g\frac{(P_1-P_2)}{\rho}} = \frac{C_d A_2}{\sqrt{1-\beta^4}}\sqrt{2g\frac{[0.029(P_1-P_2)]}{\rho}}$$

Which reduces to $$0.98=C_d\sqrt{0.029}$$

Resulting in $$C_d=5.75$$

Likewise, from said FIG. 4, that for a LO-LOSS metering tube, that about 3.05% is the differential pressure loss at Beta=0.75.
This results in $$0.98=C_d\sqrt{0.0305}$$

So that $$C_d=5.61$$

Again, from said FIG. 4, that for a UNIVERSAL FLOW TUBE that about 3.45% is reported as the differential pressure loss at a Beta=0.75.
Thus $$0.98=C_d\sqrt{0.0345}$$

So $$C_d=5.28$$

Likewise, from said FIG. 4, that a VENTURI-LONG FORM is reported as having about 11.25% differential pressure loss at a Beta=0.75.

This results in $$0.98=C_d\sqrt{0.1125}$$

So that $$C_d=2.92$$

Lastly, from said FIG. 4, that a VENTURI-SHORT FORM is reported as having about 11.10% differential pressure loss at a Beta=0.75.
Now $$0.98=C_d\sqrt{0.1110}$$

So $$C_d=2.94$$

OBJECTS AND ADVANTAGES

Venturi tube metering devices are preferred for flow measurement over nozzles and orifices because they use less energy to measure the same flow. The reason for this improvement is that the diverging section of the venturi tube is designed to convert as much as possible of the fluid velocity energy that is leaving the venturi throat section back into pressure energy at the exit of the diverging section.

The flow formulas and "$C_d$" values presented in the previous section "Background—Description of Prior Art" can be used to show the relative magnitude of the potential energy savings involved in the use of a venturi tube in preference to a flow nozzle to measure flow.

To make comparison easier, assume that "$C_d$"=1.0 for a perfect flow nozzle and a "$C_d$"=3.0 for a comparable venturi tube. Now, for the first and easiest comparison, start with all other conditions being equal, i.e., the discharge area of the nozzle is the same as the throat area of the venturi tube; the same Beta value is used; the same fluid is flowing; and that the pressure loss for the flow nozzle $(P_1-P_2)$ is the same as the overall pressure loss for the venturi tube $(P_1-P_3)$. The discharge rate for the venturi tube will calculate to be three (3) times the discharge rate for the flow nozzle because the "$C_d$" value is three (3) times greater.

Another informative comparison can be made for the venturi tube versus the flow nozzle by changing conditions so that the same discharge rate can be calculated for both. The easiest change to be envisioned in this regard is to assume that the area of the venturi throat is only one-third (⅓) the area of the flow nozzle discharge area. With all other conditions being equal as assumed previously, except that the "$C_d$" value is three (3) times greater for the venturi tube, the discharge rates for both will calculate to be the same. Thus, for the same pressure loss, the venturi tube throat area need only be one-third (⅓) the discharge area of the flow nozzle.

The relative magnitude of the potential energy savings can now be shown for the above venturi tube versus the flow nozzle comparison by changing the pressure loss terms while leaving all the other terms as equal. Now assume that the venturi tube pressure loss $(P_1-P_3)$ is only one-ninth (⅑) that of the flow nozzle pressure loss $(P_1-P_2)$. Note that the pressure loss term is under the square root symbol. The square root of one-ninth (⅑) is one third (⅓), i.e., $\sqrt{1/9}=1/3$. So that with only one-ninth (⅑) of the flow nozzle pressure loss for the venturi tube, the discharge rates for both will calculate to be the same. Thus, a venturi tube will consume only one-ninth (⅑) the pressure energy that would be consumed by a comparable flow nozzle. This energy savings goes on day after day, amounting to considerable energy cost savings over the years.

Now to compare the venturi tube performance to that of the sharp edged orifice that was presented in the previous section "Background—Description of Prior Art". As before, assume that the "$C_d$" value for the venturi tube is equal to three (3). The very best "$C_d$" value that can be calculated from the data given for a sharp edged orifice is:

$$C_d = 0.72 \times 0.99 = 0.71$$

Using the same logic as was used above for the venturi tube versus the flow nozzle, it develops that the venturi tube uses only one-eighteenth (1/18) of the energy used by the very best of the sharp edged orifices.

Now the "$C_d$" value for the worst of the sharp edged orifices that can be calculated from the data given previously is:

$$C_d = 0.61 \times 0.95 = 0.58$$

So, using the same logic as was used for the venturi tube versus the flow nozzle, it develops that the venturi tube uses only one-twenty seventh (1/27) of the energy used by the worst of the sharp edged orifices.

The energy savings of venturi tubes over wire mesh screens and sheets that are perforated with straight holes of whatever cross section, mostly fall within the range of the one-eighteenth (1/18) to one-twenty seventh (1/27) of the energy losses as presented above for the sharp edged orifices.

Plates that are perforated with venturi orifices are to be preferred for their energy saving characteristic.

Further objects and advantages of using plates that are perforated with venturi orifices to make improved devices to be used in fluid flow streams will become apparent from a consideration of the ensuing description and summary.

BRIEF DESCRIPTION OF THE DRAWINGS

The present invention will be more easily understood from the following detailed description of the preferred embodiment, when taken in conjunction with the attached drawings wherein.

DESCRIPTION OF THE PREFERRED EMBODIMENT

Figure 1:
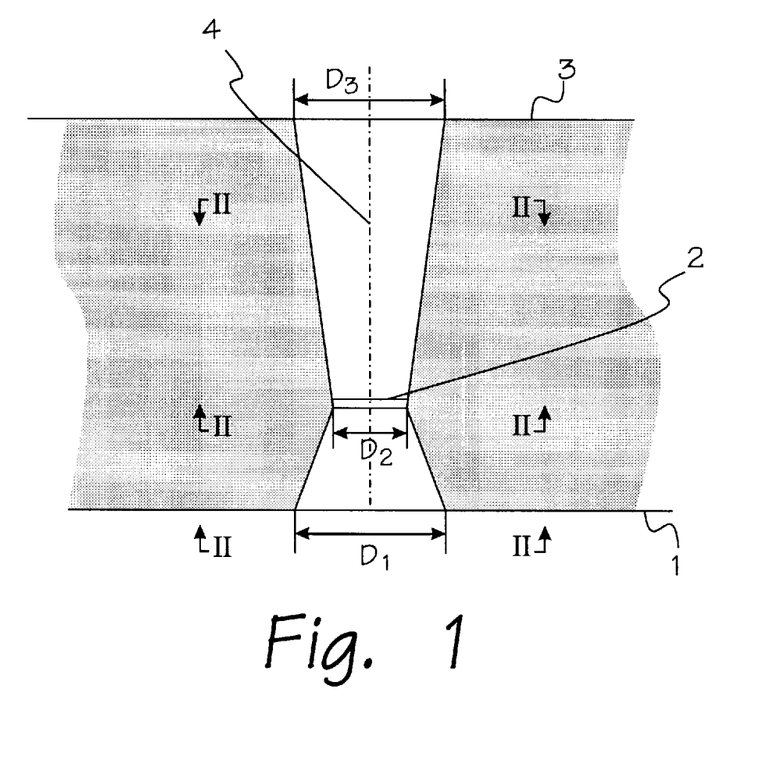
FIG. 1 is a longitudinal view taken along the centerline of a basic venturi orifice in accordance with an embodiment of the invention.

FIG. 1 is a longitudinal view of the basic venturi orifice having a converging entrance, a throat, and a diverging discharge. The preferred embodiment of the venturi orifice is proportioned similar to the standard, Herschel-type venturi meter. The ranges of the included angles and the ranges of the lengths of the parts are wider for the venturi orifices of the preferred embodiment than those usually employed in the standard, Herschel-type venturi meter because objectives other than flow measurement with the least pressure loss are considered as described in the section "Summary, Ramifications, and Scope" that follows. The inlet opening at the face 1 converges to a throat 2 that diverges to a discharge outlet at the face 3. The following section "Subscription Numerals" uses "1" for conditions at the inlet, "2" for conditions at the throat, and "3" for conditions at the discharge. Thus, "$D_1$" is the relative diameter of the inlet opening, "$D_2$" is the relative diameter of the throat, and "$D_3$" is the relative diameter of the outlet opening.

Figure 2A:
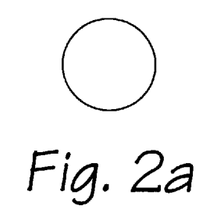
FIGS. 2a, 2b, 2c, 2d, 2e and 2f are cross-sectional views of the venturi orifice having different geometric shapes.
Figure 2B:
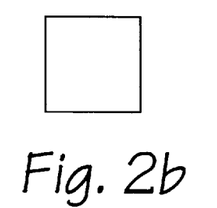
Figure 2C:
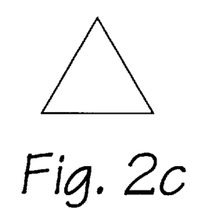
Figure 2D:
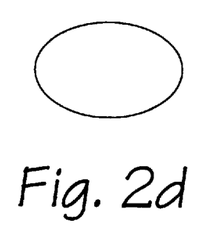
Figure 2E:
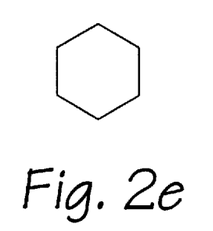
Figure 2F:
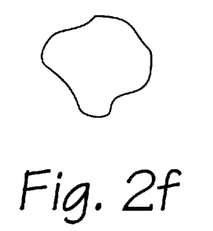

FIG. 2a shows the conventional circular cross-sectional view that is presented in technical books. FIG. 2b shows a squarish cross-sectional view. FIG. 2c shows a triangular cross-sectional view. FIG. 2d shows an elliptical cross-sectional view. FIG. 2e shows a six-sided cross-sectional view. FIG. 2f shows a cross-section representing some other geometric construction. The cross-sectional view II—II is shown at various locations to show that the cross-section of venturi orifices of the preferred embodiment change any number of times from the inlet to the outlet as best suited for the application.

Figure 3A:
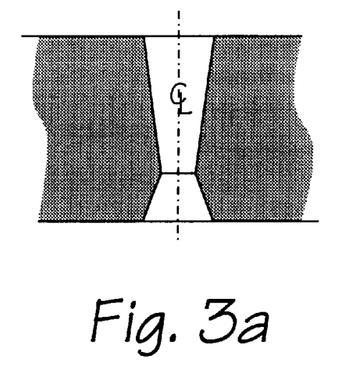
FIGS. 3a, 3b, 3c, 3d and 3e are centerlines of venturi orifices having different shapes.
Figure 3B:
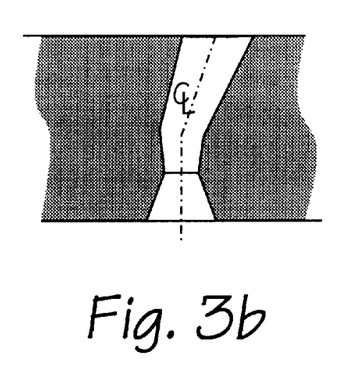
Figure 3C:
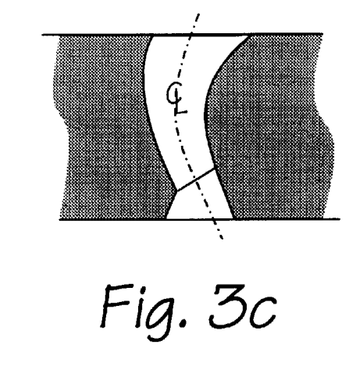
Figure 3D:
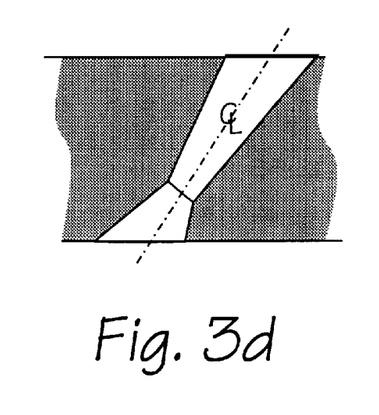
Figure 3E:
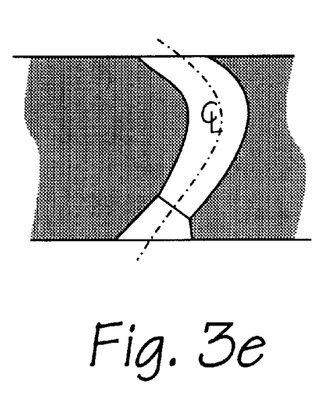

FIG. 3a shows the conventional straight centerline for a venturi orifice that is presented in technical books. FIG. 3b shows a venturi orifice centerline that is a bent straight line. FIG. 3c shows a curved venturi orifice centerline. FIG. 3d shows a venturi centerline inclined at some angle other than 90° to the plate surface. FIG. 3e shows a venturi orifice centerline that is partly straight and partly curved.

Figure 4A:
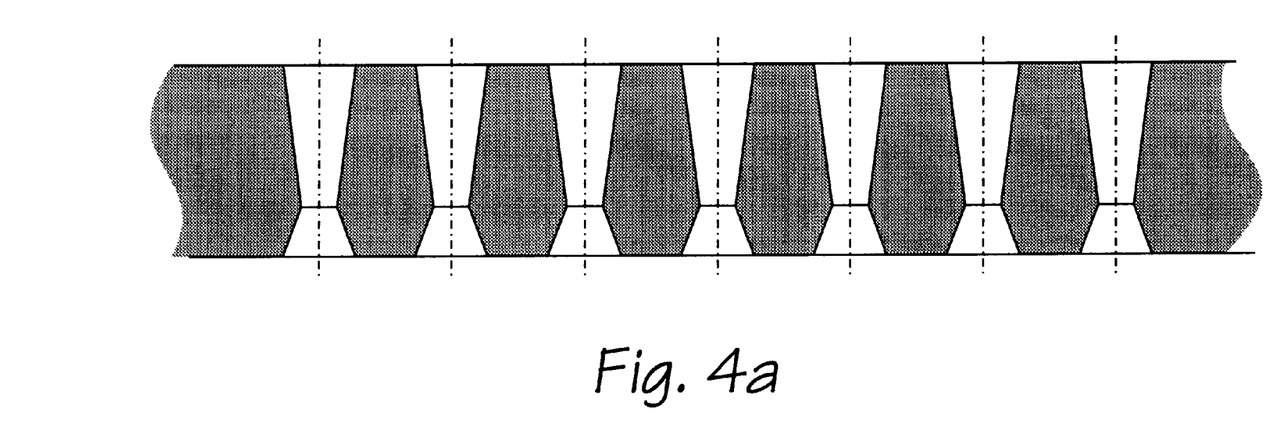
FIGS. 4a and 4b are cross-sectional views of plates perforated with venturi orifices showing uniform and variable thickness.
Figure 4B:
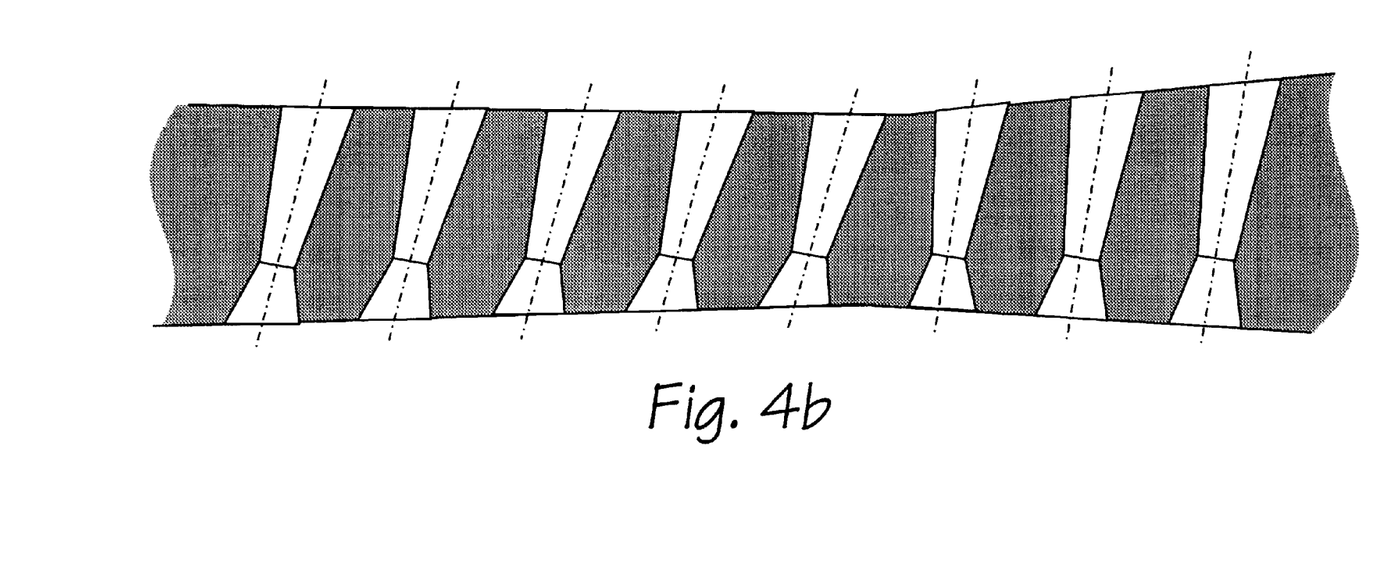

FIG. 4a shows the cross-sectional view of a flat plate of uniform thickness that is perforated with venturi orifices. FIG. 4b shows the cross-sectional view of a plate of variable thickness that has been perforated with venturi orifices.

Figure 5A:
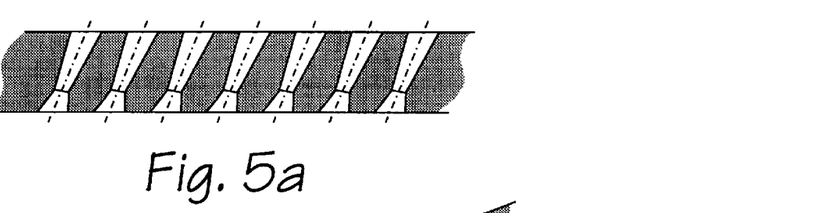
FIGS. 5a, 5b, 5c, 5d and 5e are cross-sectional views of plates perforated with venturi orifices having various surfaces.
Figure 5B:
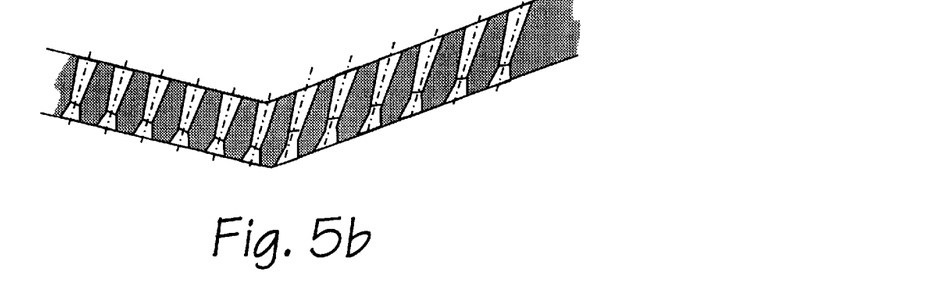
Figure 5C:
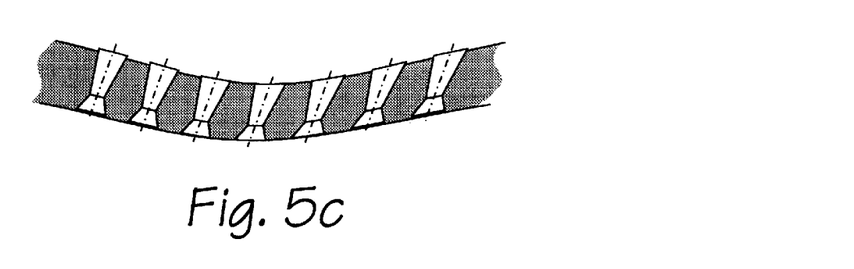
Figure 5D:
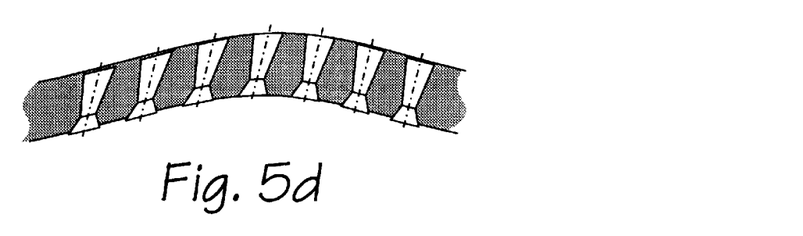
Figure 5E:
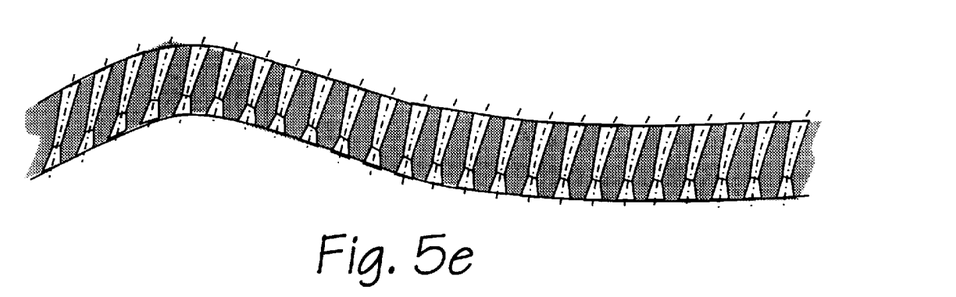

FIG. 5a shows a plate perforated with venturi orifices that has the conventional flat and parallel surfaces that is presented in technical books. FIG. 5b shows a flat plate that has been bent. FIG. 5c shows a plate with a concave surface. FIG. 5d shows a plate with a convex surface. FIG. 5e shows a plate perforated with venturi orifices that has a variable surface.

Figure 6A:
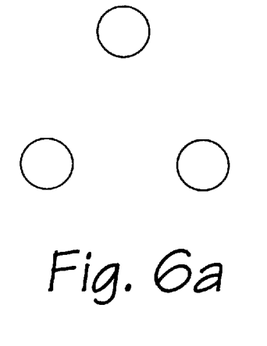
FIGS. 6a, 6b, 6c, 6d, 6e and 6f are layouts of venturi orifice centerlines on the surfaces of plates perforated with venturi orifices.
Figure 6B:
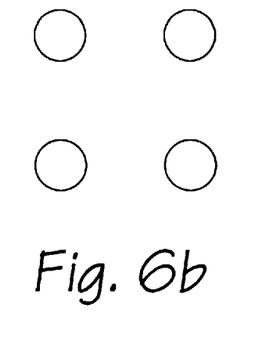
Figure 6C:
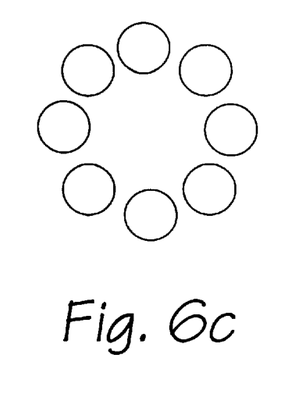
Figure 6D:
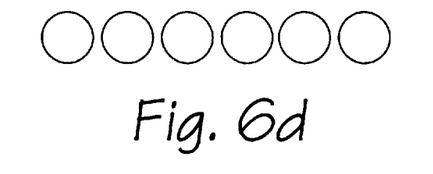
Figure 6E:
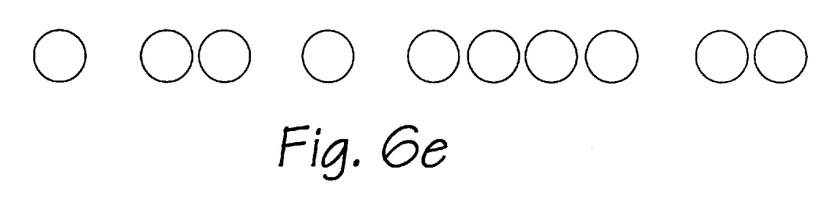
Figure 6F:
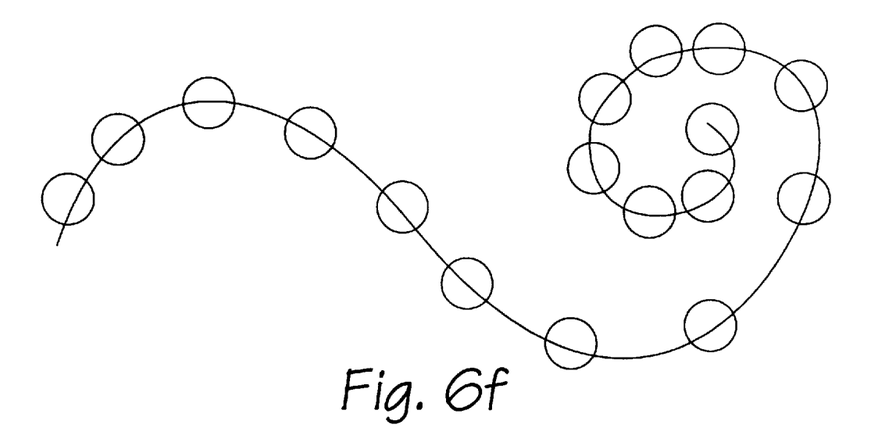

FIG. 6a shows a triangular layout of venturi orifices on the surface of plates to be perforated with venturi orifices. FIG. 6b shows a squarish layout. FIG. 6c shows a layout in a circular design. FIG. 6d shows a linear layout of venturi orifice centerlines on the surface of plates to be perforated with venturi orifices. FIG. 6e shows a non-linear layout. FIG. 6f shows a layout of venturi orifice centerlines on the surface of plates to be perforated that is of some chaotic form.

SUBSCRIPTION NUMERALS

The subscription numerals presented in the section "Background—Description of Prior Art" is to be the same throughout this patent application. The subscription "1" is used for conditions at the inlet of whatever. The subscription "2" is used for conditions at the discharge of flow nozzles, or at orifice openings, or at the throat of venturi tubes or venturi orifices. The subscription "3" is used for conditions at the discharge of venturi tubes or venturi orifices.

DESCRIPTION

The inlet area, $A_1$, of a venturi orifice will always be greater than its throat area, $A_2$. The outlet area, $A_3$, of a venturi orifice will always be greater than its throat area, $A_2$. The inlet area, $A_1$, may be smaller than the outlet area, $A_3$, the same as $A_3$, or it may be greater than $A_3$.

In normal service, the outlet pressure, $P_3$, will always be less than than the inlet pressure, $P_1$.

The outlet velocity, $v_3$, of most venturi orifices to be used will be less than the throat velocity, $v_2$. However, for some special applications, the outlet velocity, $v_3$, could be designed to be greater than the throat velocity, $v_2$.

The centerlines of the venturi orifices can be straight, bent, curved, inclined, spiralled, or any combination of these.

The cross-sectional area of the venturi orifices to be used can be of any geometrical construction that can be made using straight lines, circles, ellipses, polygons, or segments.

The cross-sectional area can change any number of times from the inlet to the outlet.

The venturi orifices to be used have no passage or passages to the throat section.

The plates to be perforated with venturi orifices can be of uniform thickness or of variable thickness. Said plates can be flat, concave, convex, rounded, or of any surface that is best suited to the application.

The layout of the venturi orifice centerlines can be of any regular or irregular design from triangular, square, circular, linear, non-linear, or of any chaotic form.

OPERATION

Valves of various shapes and sizes will be designed using the plates perforated with venturi orifices with shields that veil or unveil the number of venturi orifices that are exposed to the fluid to be controlled.

SUMMARY, RAMIFICATIONS, AND SCOPE

The "$C_d$" values that were derived in the section "Background—Description of Prior Art" are not exact and lack much in scientific explanation. However, the tendency of form for the venturi orifices will be towards those forms that indicate the higher "$C_d$" values. Obviously, the shorter forms can be produced in thinner plates, but no form is ruled out.

Further advantage in this regard can be made by assuming that a desired venturi orifice of a certain required length with a straight centerline, such a venturi orifice could be made in a thinner plate if the centerline was inclined at some angle other than being perpendicular to the surfaces of the plate.

Obviously, from the section "Background—Description of Prior Art" that "$C_d$" values greater than 3.0 can be expected which would further enhance the energy savings for venturi orifices over the other devices now marketed. However, "$C_d$" values less than 3.0 should be anticipated for the very small venturi orifices. Likewise, however, it should also be anticipated that the "$C_d$" values for the smaller openings of the other devices will decrease as well. So that the relative energy saving estimates made in the section "Objects and Advantages" will still prevail.

The diverging discharge sections of venturi tubes that are made for flow measurement with minimum pressure loss are designed to restore the outlet pressure, $P_3$, as nearly as possible to the inlet pressure, $P_1$. Such is not the case for the venturi orifices that are intended herein. The venturi orifices to be used will be designed to have the higher "$C_d$" discharge coefficient values for whatever application. For example, to design a venturi orifice to be installed in the tank wall introduced in the section "Background—Description of Prior Art", to restore the outlet pressure, $P_3$, to nearly that of the inlet pressure, $P_1$, would be wasteful because the outlet pressure energy would just be lost at the discharge. A greater discharge rate would be obtained by designing the above venturi orifice for a discharge pressure $P_3=0$.

The outlet pressure, $P_3$, for the venturi orifices to be used will only be designed to be greater than the inlet pressure, $P_1$, for those cases and times when reversed flow may be desired as for the backwashing of strainers and filters. Obviously, whenever $P_3=P_1$ that there will be no flow.

There is no reason for the cross-sectional area of venturi orifices to be limited to circles. Actual measurement of "$C_d$" values for cross-sections of other geometrical constructions may be less but may prove to be more advantageous for packing, the materials of construction, or whatever.

A good example for changing the cross-section of venturi orifices is the case for plates perforated with them to serve as strainers or filters. The throat area, $A_2$, to be used will be governed mostly by the size of the solid particles to be strained or filtered. Desire for the lowest pressure drop leads to maximizing the number of venturi orifices into each unit of surface area. One of the more logical of inlet or discharge cross-sections to use would be a hexagon.

Another practical example for changing the cross-sectional area would be layout designs for heat exchangers. A linear lineup of the venturi orifice centerlines might best serve the heat exchange surface to be used at the discharge. For this purpose, one of the more logical cross-sections to use would be rectangular to permit closer spacing of the orifice centerlines.

Plates perforated with venturi orifices will be used to make fluid distributor plates. Fluid distributor plates are the bottoms of containers of fluid beds through which passes some or all of the fluids that fluidize the solid particles of the fluid bed. The layout of the venturi orifice centerlines will be designed to best serve the fluid bed being supported and fluidized.

One practical example is for a layout of venturi orifices to pass gases into a fluid bed designed to have bubbles of gases that rise through the solid particles, usually growing in size as they rise, and burst at the top of such bubbling fluid beds. The center to center distance of such gas entry ports is set to avoid premature bubble growth by merger of bubbles that are being created above adjacent ports. Therefore, the usual practice is to maximize the number of ports in each unit of surface while maintaining the set center to center spacing. Thus, the usual practice is to use a triangular pattern, whereby the centers of three (3) adjacent ports are the vertices of an equilateral triangle whose sides are the length of the set distance.

Most fluid beds have some heat exchange surface immersed in them for temperature control. Now, where some heat exchange surface is placed above a fluid distributor plate, the layout of the venturi orifices might be linear, spiralled, or of some other pattern that is best suited to the design. The layout of the venturi orifices in the spaces between the heat exchanger layout could be of any geometric design. Thus, the layout can be of any regular, irregular, or of any chaotic pattern.

Fluid beds are used to serve many useful purposes. Fluid bed heat exchangers use fluidized solid particles to increase heat transfer. Fluid bed combustors are used to burn fuels. Fluid bed reactors are used to obtain more complete chemical reactions between solids and fluids. Many fluid beds are used to mix solids. Fluid bed conveyors are built to move solid particles in a fluidized state. Some fluid beds are made of solid particles that melt onto or chemically react with the surface of an immersed object to effect a coating such as plastic coated trays or frames. Fluid distributor plates will be designed to best serve whatever kind of fluid bed that is to be contained in whatever kind of container. Thus, the plates perforated with venturi orifices can be of uniform or of variable thickness and can be flat, concave, rounded, or of any surface that is best suited to the application.

Patented venturi meters for flow measurement have a passage or passages to the throat section to measure the pressure there. Patented flow restricting devices have a passage or passages to the throat section to measure or use the pressure there. The venturi orifices to be used have no passage or passages to the throat section.

The venturi orifices to be used are not like any jet pump, carburetor, aspirator, or ejector, in that no attempt is made to conduct a fluid into the throat section.

So called "cavitating venturies" are marketed as flow limiting devices. These devices reduce the throat pressure to the point where the flowing liquid flashes into a gas. Thus, the flow rate is limited by the pressure and properties of the fluid. The venturi orifices to be used will always be designed to avoid flashing or cavitation.

So called "critical flow nozzles" or "sonic chokes" are marketed to limit flow by having critical flow occur. Critical flow occurs at sonic velocity. Sonic velocity is the speed of sound in the fluid at some specific condition. In all applications, critical flow is to be avoided in the venturi orifices to be used.

Although the description above contains many specificities, these should not be construed as limiting the scope of the invention. For example, some fluid beds now in service use pipes with drilled holes that are installed just above a solid flat bottom to introduce the gases for fluidizing the solid particles. Now, instead of drilled holes, these gas supply pipes could be made using venturi orifices. Such gas supply pipes are to be considered as fluid distributor plates even though they really do not support the fluid bed.

Thus the scope of the invention should be determined by the appended claims and their legal equivalents, rather than by the examples given.

What is claimed is:

1. A plate, comprising:
   a layer having a thickness extending between spaced-apart opposite major surfaces;
   said layer being perforated with a plurality of venturi orifices extending between said opposite major surfaces, said venturi orifices comprising:
     an inlet;
     a converging entrance extending from said inlet;
     a throat separated from said inlet by said entrance, said throat terminating said entrance;
     a diverging discharge separated from said converging entrance by said throat; and
     an outlet terminating said discharge;
   said venturi orifice having a discharge coefficient greater in value than 1.0, where said discharge coefficient equals a ratio of a rate of discharge from said venturi orifice to a rate of discharge from a perfect nozzle that has the same discharge area as said throat of said venturi orifice when entrance velocity is insignificant;
   said venturi orifice having no cavitation in normal service; and
   said throat of said venturi orifice being free of any passage other than said entrance and said discharge.

2. A plate according to claim 1, further comprised of centerlines of said venturi orifices being straight.

3. A plate according to claim 1, further comprised of cross-sectional area of said venturi orifices changing between said inlet and said outlet.

4. A plate according to claim 1, further comprised of said thickness of said plate being variable.

5. A plate according to claim 1, further comprised of layout of centers of said venturi orifices forming a regular array.

6. A plate according to claim 5, further comprised of centerlines of said venturi orifices through said thickness of said plate being substantially parallel to one another.

7. A plate according to claim 1, further comprised of centerlines of said venturi orifices being curved.

8. A plate according to claim 1, further comprised of centerlines of said venturi orifices being inclined relative to one of said opposite major surfaces.

9. A plate according to claim 1, further comprised of said thickness of said plate being uniform.

10. A plate according to claim 1, further comprised of layout of centers of said venturi orifices forming a triangular array.

11. A plate according to claim 1, further comprised of said plate being flat.

12. A plate according to claim 1, further comprised of said plate being concave.

13. A plate according to claim 1, further comprised of said plate being convex.

14. A plate according to claim 1, further comprised of centerlines of said plate being straight.

15. A plate according to claim 1, further comprised of centerlines of said venturi orifices being transverse to said opposite major surfaces.

16. A plate according to claim 1, further comprised of centerlines of said venturi orifices being substantially parallel to one another and transverse to said opposite major surfaces.

17. A plate, comprising:
    a plate; and
    a plurality of venturi orifices perforating said plate, said venturi orifices comprising a passage sequentially progressing from a converging entrance, a throat and a diverging discharge, said venturi orifices each providing a discharge coefficient greater in value than 1.0, where said discharge coefficient equals a ratio of a rate of discharge from said venturi orifice to a rate of discharge from a perfect nozzle having the same discharge area as said throat of said venturi orifice when entrance velocity is insignificant.

18. A plate according to claim 17, further comprising said throat of said venturi being pierced only by said passage.

19. A plate according to claim 17, further comprised of centerlines of said venturi orifices being straight.

20. A plate according to claim 17, further comprised of cross-sectional area of said venturi orifices changing between said entrance and said discharge.

21. A plate according to claim 17, further comprised of said thickness of said plate being variable.

22. A plate according to claim 17, further comprised of centers of said venturi orifices forming a regular array.

23. A plate according to claim 17, further comprised of centerlines of said venturi orifices being substantially parallel to one another and transverse to said opposite major surfaces.

24. A plate according to claim 17, further comprised of centerlines of said venturi orifices through said plate being substantially parallel to one another.

25. A plate according to claim 17, further comprised of centerlines of said plate being substantially parallel.

26. A plate according to claim 17, further comprised of centerlines of said venturi orifices being transverse to said opposite major surfaces.

27. A plate, comprising:
- a layer having a thickness extending between spaced-apart opposite major surfaces;
- said layer being perforated with a plurality of venturi orifices extending between said opposite major surfaces, said venturi orifices comprising:
  - an inlet;
  - a throat;
  - an outlet;
  - a converging entrance interposed between said inlet and said throat; and
  - a diverging discharge interposed between said throat and said outlet;
- said venturi orifice having a discharge coefficient greater in value than 1.0, where said discharge coefficient equals a ratio of a rate of discharge from said venturi orifice to a rate of discharge from a perfect nozzle that has the same discharge area as said throat of said venturi orifice when entrance velocity is insignificant.

28. A plate according to claim 27, further comprising said throat of said venturi being pierced only by said passage.

29. A plate according to claim 27, further comprised of said centerlines being substantially parallel to one another and transverse to one of said major surfaces.

30. A plate according to claim 27, further comprised of centerlines of said venturi orifices through said plate being substantially parallel to one another.

\* \* \* \* \*